US008777792B2

(12) United States Patent
Imai et al.

(10) Patent No.: US 8,777,792 B2
(45) Date of Patent: Jul. 15, 2014

(54) PLANETARY GEAR SYSTEM

(75) Inventors: Hideyuki Imai, Akashi (JP); Tatsuhiko Goi, Kobe (JP); Hidenori Arisawa, Kakogawa (JP); Motohiko Nishimura, Matsudo (JP); Maiko Sato, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/640,992

(22) PCT Filed: Apr. 8, 2011

(86) PCT No.: PCT/JP2011/002082
§ 371 (c)(1),
(2), (4) Date: Dec. 21, 2012

(87) PCT Pub. No.: WO2011/129076
PCT Pub. Date: Oct. 20, 2011

(65) Prior Publication Data
US 2013/0102432 A1  Apr. 25, 2013

(30) Foreign Application Priority Data

Apr. 13, 2010  (JP) ................................. 2010-092559

(51) Int. Cl.
*F16H 57/04* (2010.01)
(52) U.S. Cl.
USPC ........................................................ 475/159
(58) Field of Classification Search
CPC ... F16H 57/04; F16H 57/042; F16H 57/0421; F16H 57/0427; F16H 57/0431
USPC .................................................. 475/159, 160
See application file for complete search history.

(56) References Cited

U.S. PATENT DOCUMENTS

| 5,251,725 | A | * | 10/1993 | Barrett, Jr. .................... 184/6.14 |
| 5,472,383 | A | * | 12/1995 | McKibbin ...................... 475/159 |
| 6,039,667 | A | * | 3/2000 | Schunck et al. ............... 475/159 |
| 6,223,616 | B1 | * | 5/2001 | Sheridan ......................... 74/468 |
| 2008/0006018 | A1 | | 1/2008 | Sheridan et al. |

FOREIGN PATENT DOCUMENTS

| JP | 9-507284 A | 7/1997 |
| JP | 10-318356 A | 12/1998 |
| JP | 2008-014489 A | 1/2008 |
| JP | 2010-060069 A | 3/2010 |

* cited by examiner

*Primary Examiner* — Edwin A Young
(74) *Attorney, Agent, or Firm* — Sughrue Mion, PLLC

(57) ABSTRACT

A planetary gear system (1) includes: a sun gear (5) having external teeth; a plurality of planet gears (7) having external teeth, each planet gear meshing with the sun gear; a ring gear (9) having internal teeth, the ring gear meshing with the planet gears; and a baffle unit (35) disposed between the planet gears which are adjacent to each other, the baffle unit having side faces (37F, 37R) positioned near the respective planet gears. The baffle unit (35) has: oil supply holes (47) which are formed in a tip portion (41) facing an outer periphery of the sun gear (5) and which jet out lubricating oil (OL) to mesh positions (43, 45) between the sun gear and the planet gears; and a collection opening (55) which is formed in at least one of the side faces and through which the lubricating oil (OL) that has been jetted out is collected into the baffle unit (35).

7 Claims, 8 Drawing Sheets

PLANETARY GEAR SYSTEM

CROSS REFERENCE TO RELATED APPLICATIONS

This application is a National Stage of International Application No. PCT/JP2011/002082 filed Apr. 8, 2011, claiming priority based on Japanese Patent Application No. 2010-092559 filed Apr. 13, 2010, the contents of all of which are incorporated herein by reference in their entirety.

TECHNICAL FIELD

The present invention relates to a planetary gear system mainly used in a power transmission mechanism of an aircraft, and particularly to a lubricating structure of such a planetary gear system.

BACKGROUND ART

In recent years, one of the key issues in the aircraft industry is to improve the fuel efficiency of aircrafts from the viewpoint of reduction of aircraft operation costs as well as environmental conservation. Accordingly, reduction in power loss of planetary gear systems for use in aircraft engines is also required.

Conventionally, such a planetary gear system includes a mechanism for supplying lubricating oil to the gears for the purpose of lubricating and cooling down the gears. Here, agitation resistance of the lubricating oil that is supplied around the gears is one of the main causes of power loss in the planetary gear system. One of the techniques proposed for reducing such agitation resistance of lubricating oil is, for example, as follows: lubricating oil that has been supplied to a mesh position between a sun gear and a planet gear is discharged axially by utilizing rotation of the planet gear which is a double helical gear, and a baffle (a barrier) is provided between adjacent planet gears, so that generation of a swirl flow due to interference of flows of lubricating oil that are generated around the adjacent planet gears is suppressed (see Patent Literature 1, for example).

CITATION LIST

Patent Literature

PTL 1: Japanese National Phase PCT Laid-Open Publication No. 9-507284

SUMMARY OF INVENTION

Technical Problem

However, in relation to the above structure, there is a conceivable problem as described below. In the above structure, the lubricating oil which is a fluid is discharged from the axially central portion of the double helical gear in both outward directions. Here, no locally vacuum portion occurs in the fluid. Considering such continuity of the fluid, it is presumed that efficient discharging of the lubricating oil is difficult. Moreover, since a baffle is disposed near the outer periphery of a planet gear, the lubricating oil that exits the mesh position flows out while being adhered to the outer periphery of the planet gear. As a result, the agitation resistance of the lubricating oil increases.

Furthermore, it is difficult to reduce power loss sufficiently unless not only lubricating oil around the central sun gear and planet gears but also lubricating oil around other rotating components, such as an outer peripheral ring gear and bearings provided in the planetary gear system, are smoothly discharged.

An object of the present invention is to provide a planetary gear system with reduced power loss, by reducing lubricating oil agitation resistance through efficient discharging of lubricating oil supplied to main rotating components of the planetary gear system.

Solution to Problem

In order to achieve the above object, a planetary gear system according to the present invention includes: a sun gear having external teeth; a plurality of planet gears having external teeth, each planet gear meshing with the sun gear; a ring gear having internal teeth, the ring gear meshing with the planet gears; and a baffle unit disposed between the planet gears which are adjacent to each other, the baffle unit having side faces positioned near outer peripheries of the respective planet gears. The baffle unit has: oil supply holes which are formed in a tip portion facing an outer periphery of the sun gear and which jet out lubricating oil to mesh positions between the sun gear and the planet gears; and a collection opening which is formed in at least one of the side faces and through which the lubricating oil that has been jetted out is collected into the baffle unit.

According to this structure, the baffle unit is provided between the planet gears which are adjacent to each other, and the baffle unit collects the lubricating oil therein while preventing flows of the lubricating oil around the respective adjacent planet gears from interfering with each other. This makes it possible to prevent a large amount of lubricating oil from being adhered to the outer periphery of the planet gears over a long circumferential distance. Accordingly, the agitation resistance of the lubricating oil is reduced. As a result, power loss of the planetary gear system is reduced.

In the planetary gear system according to the present invention, each planet gear is preferably a double helical gear having an annular groove formed at an outer circumferential face of an axially central portion of the double helical gear. According to this structure, the lubricating oil can be collected into the annular groove of the axially central portion of each planet gear by utilizing rotation of the planet gear. This makes it possible to efficiently discharge the lubricating oil.

In the planetary gear system according to the present invention, it is preferred that a guide piece which guides the lubricating oil to the collection opening is formed at the at least one of the side faces of the baffle unit. According to this structure, the amount of lubricating oil that flows outward in the planetary gear system beyond the collection opening can be reduced. Therefore, the lubricating oil can be very efficiently collected into the baffle unit through the collection opening.

In the planetary gear system according to the present invention, it is preferred that the baffle unit has a ring gear oil supply hole formed therein, through which the collected lubricating oil is supplied to the ring gear. According to this structure, the lubricating oil that has been collected into the baffle unit can be discharged to the radially outer side of the planetary gear system, and also, the lubricating oil can be used to lubricate the ring gear. This makes it possible to effectively reduce power loss of the planetary gear system.

In the planetary gear system according to the present invention, it is preferred that the baffle unit has an outlet formed therein, through which the collected lubricating oil is discharged in an axial direction. According to this structure, the collected lubricating oil is discharged in the axial direction, and thereby the collection of the lubricating oil can be facilitated. Therefore, the agitation resistance can be reduced more effectively.

In the planetary gear system according to the present invention, the baffle unit may include a weir, which blocks the outlet at a radially outer side of the planet gears and at a backward side with respect to a revolution direction of the planet gears. Since the weir is provided at the outlet as described above, a sufficient amount of lubricating oil to be supplied to the ring gear through the ring gear oil supply hole can be kept within the baffle unit. In particular, Centrifugal force and Coriolis force generated by revolution of the planet gears are both exerted on the lubricating oil that has been collected into the baffle unit. Accordingly, the lubricating oil can be effectively kept by blocking, with the weir, the outlet at the radially outer side of the planet gears and at the backward side with respect to the revolution direction of the planet gears, that is, by blocking, with the weir, a portion positioned in the direction of resultant force of the centrifugal force and the Coriolis force.

In the planetary gear system according to the present invention, it is preferred that a collection guide groove which guides the lubricating oil to the collection opening is formed so as to extend from an inner end of the at least one of the side faces of the baffle unit to the collection opening. According to this structure, the lubricating oil can be collected more effectively.

Advantageous Effects of Invention

According to the planetary gear system of the present invention, lubricating oil supplied to main rotating components of the planetary gear system can be efficiently discharged. As a result, the agitation resistance of the lubricating oil is reduced, and thereby power loss of the planetary gear system is reduced greatly.

DESCRIPTION OF EMBODIMENTS

Figure 1:
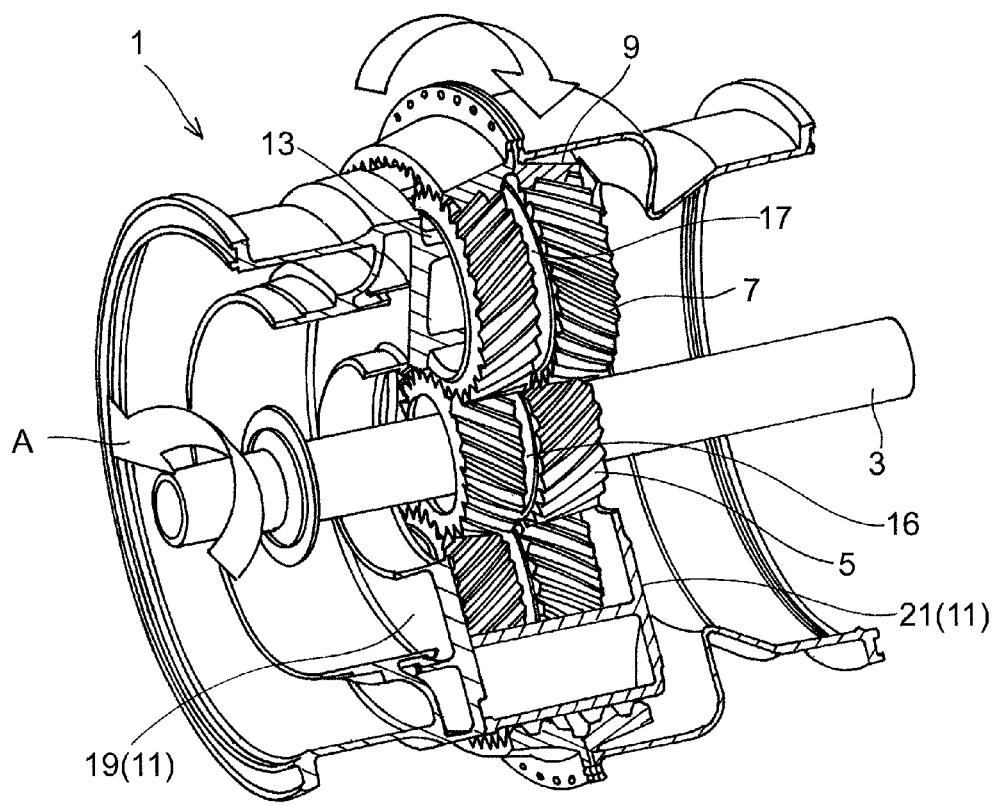
FIG. 1 is a partially cutaway perspective view showing a planetary gear system according to one embodiment of the present invention.

Hereinafter, a preferred embodiment of the present invention is described with reference to the accompanying drawings. FIG. 1 is a perspective view showing a planetary gear system 1 according to one embodiment of the present invention. The planetary gear system 1 is installed in an aircraft engine, and transmits power of an input shaft 3 as two outputs. It should be noted that in the description below, along the axial direction of the planetary gear system 1, one side of the planetary gear system 1, at which side the engine is disposed (i.e., the lower left side in FIG. 1), is referred to as a front side, and the opposite side is referred to as a rear side.

Figure 2:
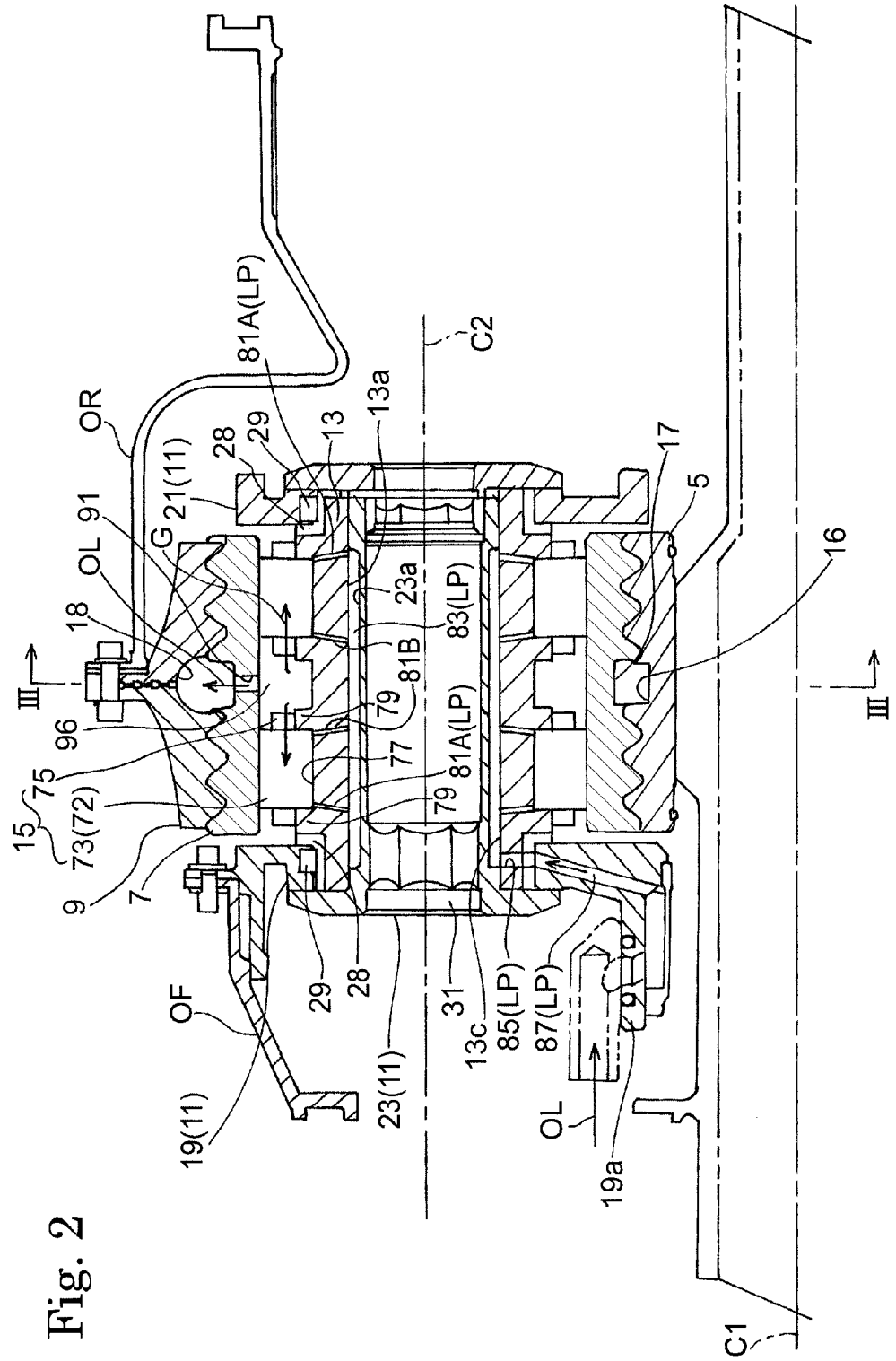
FIG. 2 is a longitudinal sectional view of the planetary gear system shown in FIG. 1.

The planetary gear system 1 is configured as a double-row gear mechanism, which includes: a central sun gear 5; planet gears 7; and an outer ring gear 9. The sun gear 5 is a double helical gear including a pair of helical gears and having sets of external teeth, the sets of external teeth being inclined in respective directions that are opposite to each other. The sun gear 5 is fitted to the outer periphery of the input shaft 3 which acts as the rotational axis. Each planet gear 7 is a double helical gear having a pair of sets of external teeth, and includes helical gears corresponding to the helical gears of the sun gear 5. Each planet gear 7 meshes with the sun gear 5. As described in detail below in this embodiment, four planet gears 7 are arranged in the circumferential direction of the sun gear 5 at equal intervals. The ring gear 9 is a double helical gear including a pair of helical gears with internal teeth. The ring gear 9 meshes with the four planet gears 7. The sun gear 5 has an annular groove 16 formed at its axially central portion, that is, at its outer circumferential face between the pair of sets of teeth. Also, each planet gear 7 has an annular groove 17 formed at its axially central portion, that is, at its outer circumferential face between the pair of sets of teeth. Further, the ring gear 9 has an annular groove 18 formed at its axially central portion, that is, at its inner circumferential face between the pair of sets of teeth. FIG. 2 is a longitudinal sectional view showing a main part of the planetary gear system 1 in FIG. 1. In FIG. 2, the front side is on the left, and the rear side is on the right. As shown in FIG. 2, each planet gear 7 is rotatably supported, via a respective double row bearing 15, at the outer periphery of a corresponding planet shaft 13 which has a hollow center. Both front and rear ends of the planet shaft 13 are attached to a planet carrier 11.

The front end of the planet shaft 13 is supported by an annular front plate 19 which shares the same central axis C1 with the input shaft 3. On the other hand, the rear end of the planet shaft 13 is supported by an annular back plate 21 which is disposed concentrically to the front plate 19. As described in detail below, the back plate 21 is connected and fixed to the front plate 19 via fixed support shafts 23. The front plate 19 and the back plate 21, which are connected to each other by bolts via the fixed support shafts 23, form the planet carrier 11 which supports the planet shafts 13 and the planet gears 7. The planet carrier 11 determines the relative positions of the planet shafts 13 relative to one another, that is, determines the relative positions of the planet gears 7 relative to one another.

The front end of each planet shaft 13 in the axial direction penetrates through the front plate 19, and the rear end of each planet shaft 13 in the axial direction penetrates through the back plate 21. The front plate 19 is fixed to the front end of each planet shaft 13 in the axial direction by means of the respective fixed support shaft 23, which is a headed shaft having a hollow center and which is inserted in the hollow center of the corresponding planet shaft 13 through the front end of the planet shaft 13. The back plate 21 is fixed to the rear end of each planet shaft 13 in the axial direction by means of a respective headed nut threadably mounted to a female screw provided at the rear end of the corresponding planet shaft 13. In this manner, the front plate 19, the planet shafts 13, and the back plate 21 are fastened in the axial direction and thereby fixed. For each planet shaft 13, cushioning 28 and a spacer 29 are interposed between the outer periphery of the planet shaft 13 and the front plate 19, as well as between the outer periphery of the planet shaft 13 and the back plate 21.

A front output shaft OF, which is concentric to the input shaft 3, is connected to the outer circumferential face of the front plate 19. Power derived from revolution of the four planet gears 7 around the system's central axis C1 is outputted frontward via the front output shaft OF. A rear output shaft OR, which is concentric to the input shaft 3, is connected to the rear side of the outer periphery of the ring gear 9. Power derived from rotation of each planet gear 7 around its rotational central axis C2 is outputted rearward via the ring gear 9 and the rear output shaft OR. It should be noted that, as an alternative, the ring gear 9 may be set to be not rotatable or the planet carrier 11 may be set to be not rotatable, such that the power is outputted either frontward only or rearward only.

Figure 3:
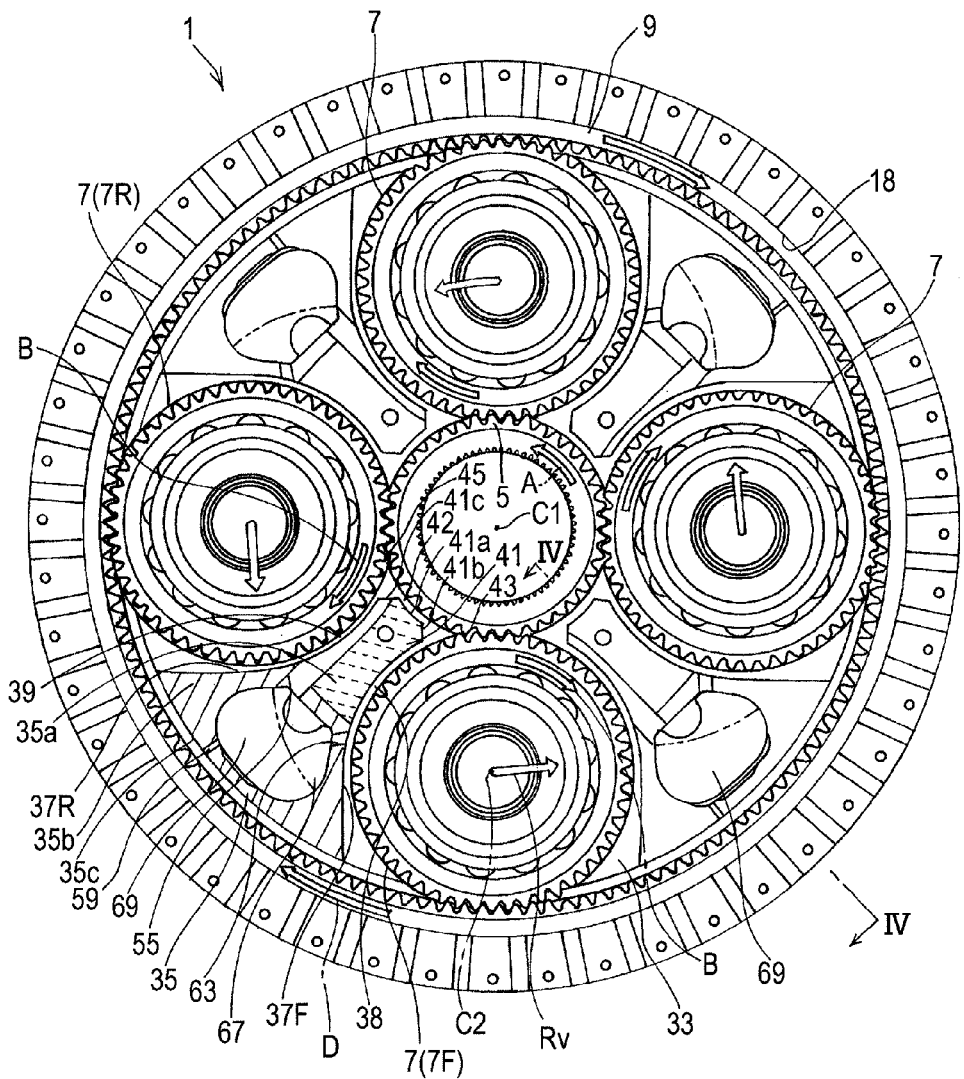
FIG. 3 is a transverse sectional view of the planetary gear system shown in FIG. 1.

FIG. 3 shows a transverse sectional view of the planetary gear system 1 along line III-III indicated in FIG. 2. The four planet gears 7 are arranged in the circumferential direction at equal intervals between the sun gear 5 and the ring gear 9. There are multiple intergear spaces 33 (in this embodiment, four intergear spaces 33 in total), each of which is surrounded by the sun gear 5, two planet gears 7 that are adjacent to each other in the circumferential direction, and the ring gear 9. A baffle unit 35 is provided in each intergear space 33. Hereinafter, the structure of the baffle unit 35 is described in detail. It should be noted that, when one among the baffle units 35 is referred to in the description below, the planet gear 7 that is positioned forward from the one baffle unit 35 with respect to the counterclockwise revolution direction Rv of the planet gears 7 may be called a "forward planet gear 7F", and the planet gear 7 that is positioned backward from the one baffle unit 35 with respect to the revolution direction Rv may be called a "backward planet gear 7R".

Each baffle unit 35 includes an inner portion 35a and an outer portion 35b. The inner portion 35a is positioned at the radially inner part of the intergear space 33, which is a part close to the system's central axis C1. The outer portion 35b is positioned at the radially outer part of the intergear space 33, which is a part close to the ring gear 9. In the diagram, the inner portion 35a is indicated by dashed-line hatching, and the outer portion 35b is indicated by solid-line hatching.

As shown in FIG. 3, the baffle unit 35 has a forward side face 37F which is formed in a recessed curved shape. The forward side face 37F has a part that extends substantially along the outer circumferential shape of the forward planet gear 7F, the part extending from the inner portion 35a to the inner part of the outer portion 35b. The forward side face 37F of the baffle unit 35 is positioned near the forward planet gear 7F. A forward gap 38 having a curved transverse sectional shape is formed between the forward side face 37F of the baffle unit 35 and the forward planet gear 7F. Similarly, the inner portion 35a of the baffle unit 35 has a backward side face 37R which is formed in a recessed curved shape and which extends substantially along the outer circumferential shape of the backward planet gear 7R. The backward side face 37R of the baffle unit 35 is positioned near the backward planet gear 7R. A backward gap 39 having a curved transverse sectional shape is formed between the backward side face 37R of the baffle unit 35 and the backward planet gear 7R.

The baffle unit 35 has a tip portion 41 which faces the outer periphery of the sun gear 5. The tip portion 41 has a tip face 41a which is positioned near the sun gear 5 and which has a curved shape substantially extending along the outer periphery of the sun gear 5. The tip face 41a of the baffle unit 35 is positioned near the sun gear 5. An inner gap 42 having a curved transverse sectional shape is formed between the tip face 41a of the baffle unit 35 and the sun gear 5. A forward inclined face 41b is formed at one end of the tip face 41a of the baffle unit 35 and a backward inclined face 41c is formed at the other end of the tip face 41a of the baffle unit 35. The forward inclined face 41b faces a mesh position 43 between the sun gear 5 and the forward planet gear 7F (forward mesh position). The backward inclined face 41c faces a mesh position 45 between the sun gear 5 and the backward planet gear 7R (backward mesh position).

Preferably, the size of each of the forward gap 38, the backward gap 39, and the inner gap 42 is in the range of 3 to 7 mm. More preferably, the size of each gap is in the range of 4 to 6 mm. Setting the size of each gap within this range makes it possible to suppress an increase in the overall size of the planetary gear system 1 and to sufficiently obtain a path for lubricating oil OL that has not flowed into any of the annular grooves 16, 17, and 18 of the sun gear 5, the planet gears 7, and the ring gear 9 (see FIG. 1) and that remains on the tooth surface of these gears. This contributes to reducing the agitation resistance of the lubricating oil OL.

Figure 4:
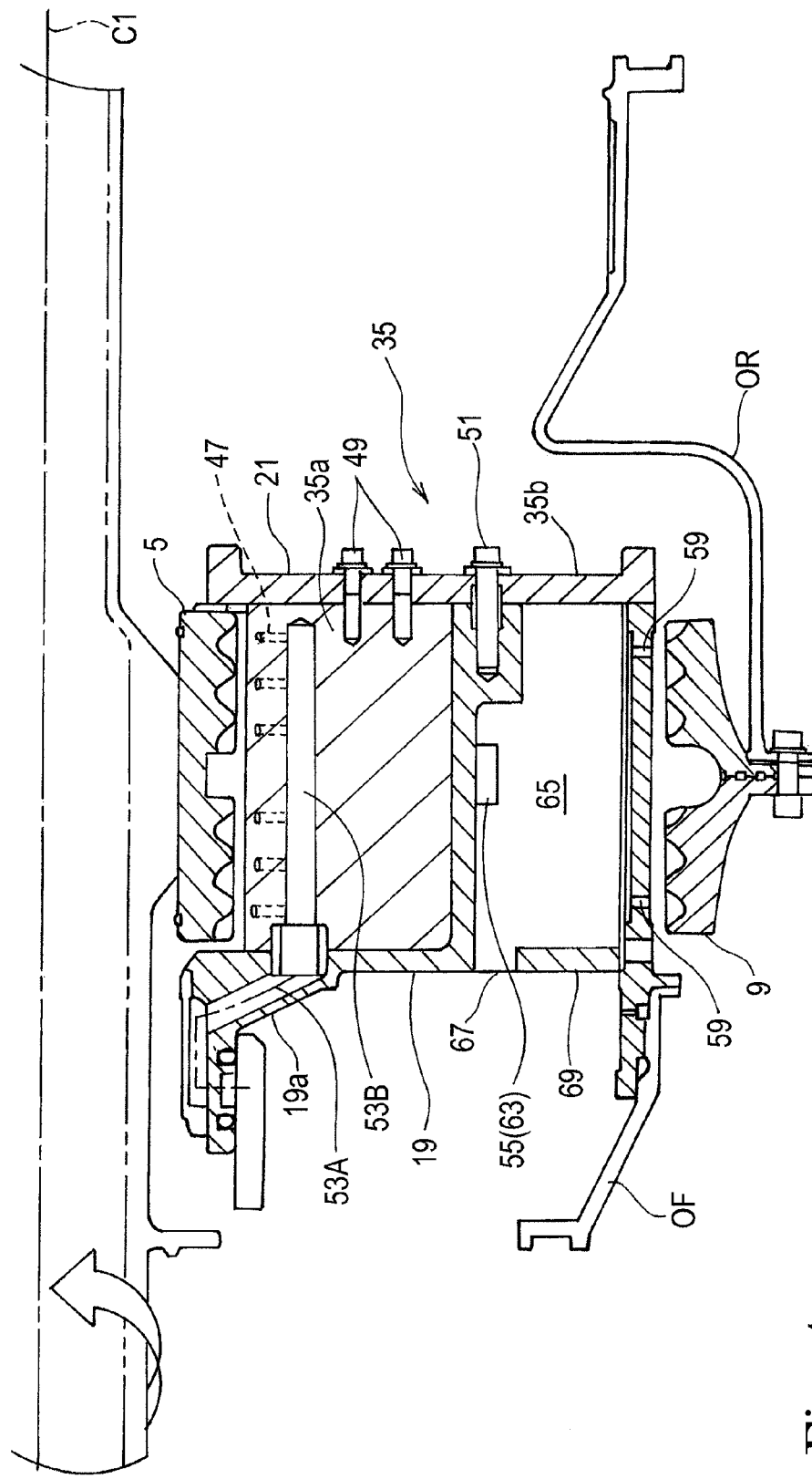
FIG. 4 is a cross-sectional view along line IV-IV indicated in FIG. 3.

FIG. 4 is a cross-sectional view along line IV-IV indicated in FIG. 3. In FIG. 4, the front side is on the left, and the rear side is on the right. As shown in FIG. 4, the inner portion 35a of the baffle unit 35 is formed as a solid portion, and is fixed to the back plate 21 by bolts 49. The front plate 19 and the back plate 21 are connected to each other by a bolt 51. A gear lubricating oil guide path 53A is formed at the inner portion 35a of the baffle unit 35. A gear lubricating oil guide path 53B is formed at the front plate 19. These gear lubricating oil guide paths 53A and 53B communicate with oil supply holes 47 which will be described below. At the inner circumferential portion of the front plate 19, a cylindrical portion 19a is formed to protrude frontward in the axial direction. The gear lubricating oil guide path 53B communicates with the outside via the outer circumferential face of the cylindrical portion 19a.

Figure 5:
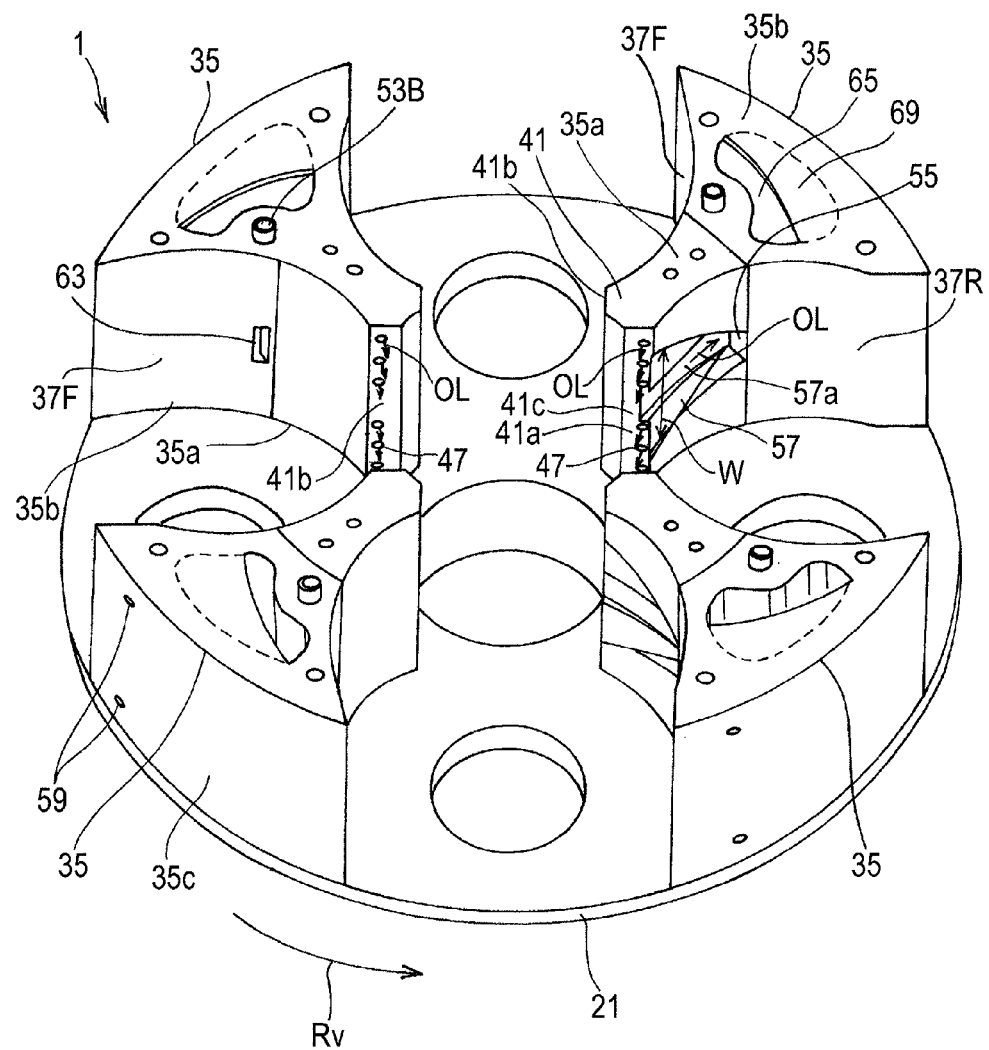
FIG. 5 is a perspective view of baffle units shown in FIG. 3.

As shown in FIG. 5, the forward inclined face 41b and the backward inclined face 41c of the baffle unit 35 are each provided with multiple oil supply holes 47 (in this embodiment, six oil supply holes 47) which are arranged in the axial direction. The oil supply holes 47 are provided for jetting out the lubricating oil OL which is supplied from the outside.

A backward collection opening 55 is formed in the backward side face 37R of the baffle unit 35, such that the backward collection opening 55 is located at a position near the boundary between the inner portion 35a and the outer portion 35b, which position is substantially the central position of the backward side face 37R in the axial direction. The backward collection opening 55 is provided for collecting the jetted lubricating oil OL into the baffle unit 35. The backward collection opening 55 is open in the inner radial direction of the planetary gear system 1. A collection guide groove 57 for guiding the lubricating oil OL to the backward collection opening 55 is formed so as to extend from the inner end of the backward side face 37R to the backward collection opening 55. The collection guide groove 57 has an axial direction width W, which is greatest at the inner end of the backward side face 37R. The shorter the distance to the backward collection opening 55, which is located outer than the inner end of the backward side face 37R, the smaller is the axial direction width W.

The collection guide groove 57 has a central portion 57a which is formed as a deeper groove than its adjacent portions. The central portion 57a is the central portion of the collection guide groove 57 in the axial direction, and its position in the axial direction corresponds to that of the annular groove 17 (FIG. 2) of the planet gear 7. It should be noted that the multiple oil supply holes 47 are not formed at axial directional positions that correspond to the position, in the axial direction, of the central portion 57a of the collection guide groove 57, but are formed at equal intervals at more frontward and rearward positions in the axial direction. That is, the multiple oil supply holes 47 are formed such that their positions in the axial direction correspond to the positions of the teeth of the planet gear 7 and the teeth of the sun gear 5 in the axial direction (FIG. 2).

Further, as shown in FIG. 5, ring gear oil supply holes 59, which are through-holes extending in the radial direction, are formed in a wall 35c of the baffle unit 35. The wall 35c is the outermost portion of the baffle unit 35. The ring gear oil supply holes 59 (in this embodiment, two ring gear oil supply holes 59) in the wall 35c are arranged in the axial direction with a predetermined interval therebetween. The ring gear oil supply holes 59 are arranged at positions that are located backward from the center of the wall 35c with respect to the revolution direction Rv of the planet gear 7. It should be noted that the number and the positions of the oil supply holes 47 and the ring gear oil supply holes 59 may be set to any number and positions as appropriately.

A forward collection opening 63 is formed in the forward side face 37F of the baffle unit 35, such that the forward collection opening 63 is located at the substantially central position in the axial direction at the outer end of the forward side face 37F, that is, near the boundary between the inner portion 35a and the outer portion 35b. The forward collection opening 63 is provided for collecting the jetted lubricating oil OL into the baffle unit 35. The forward collection opening 63 is open inward in a direction diagonal to the radial direction of the planetary gear system 1.

Figure 6:
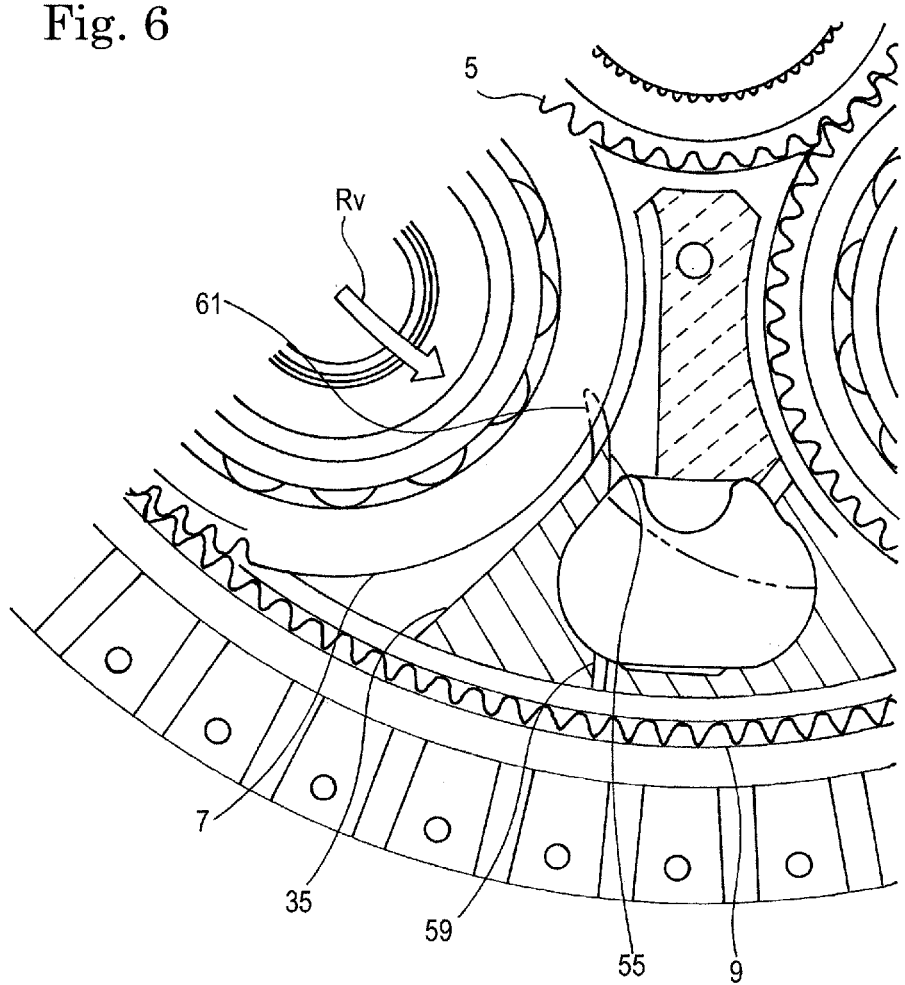
FIG. 6 is a cross-sectional view of a variation of the planetary gear system shown in FIG. 3.

It should be noted that, as in a variation shown in FIG. 6, a guide piece 61 may be provided at the outer side of the backward collection opening 55. The guide piece 61 provided at the outer side of the backward collection opening 55 is a claw-like member which protrudes inward. The tip of the guide piece 61 is positioned within the annular groove 17 which is formed at the center of the planet gear 7. The guide piece 61 blocks the lubricating oil OL from flowing outward beyond the backward collection opening 55, and guides the lubricating oil OL into the backward collection opening 55. The guide piece 61 may be formed to be integrated with the baffle unit 35. Alternatively, the guide piece 61 may be formed as a separate component from the baffle unit 35, and then joined to the baffle unit 35 by welding or the like.

As shown in FIG. 4, the outer portion 35b of the baffle unit 35 is formed to have a hollow center. The inner space of the baffle unit 35 communicates with the backward collection opening 55 and the forward collection opening 63, and acts as a collection chamber 65 which provisionally stores the lubricating oil OL that is collected through these collection openings 55 and 63. An opening of the collection chamber 65 at the rear end in the axial direction is fully sealed by the back plate 21. Meanwhile, an opening of the collection chamber 65 at the front end in the axial direction acts an axial directional outlet 67 for discharging the lubricating oil OL from the collection chamber 65 to the outside of the baffle unit 35 in the axial direction. The axial directional outlet 67 is partially blocked by a weir 69.

Figure 7:
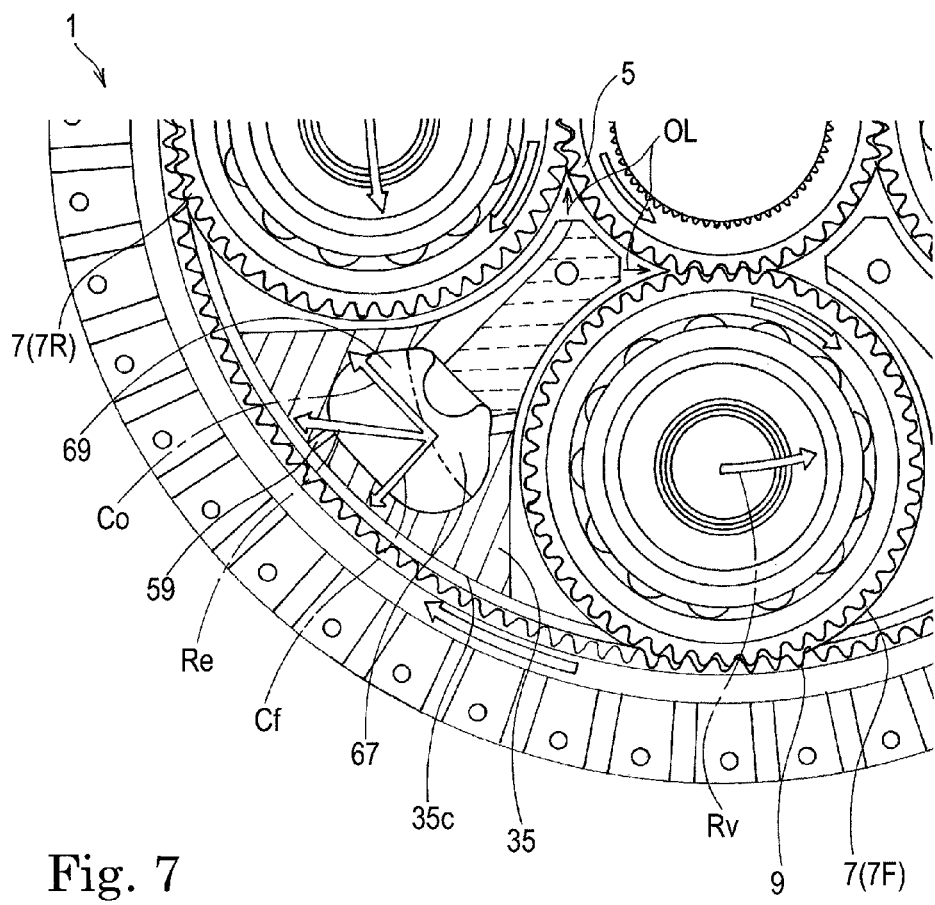
FIG. 7 is a cross-sectional view showing a main part of FIG. 3 in an enlarged manner.

As shown in FIG. 7 which is an enlarged view of a main part of FIG. 3, the weir 69 blocks the radially outer side of the axial directional outlet 67 and the backward side of the axial directional outlet 67 with respect to the revolution direction Rv. Centrifugal force Cf and Coriolis force Co generated by the revolution of the planet gear 7 are both exerted on the lubricating oil OL that is collected within the collection chamber 65 of the baffle unit 35. Accordingly, the lubricating oil OL can be effectively caught into the collection chamber 65 by blocking, with the weir 69, the radially outer side of the axial directional outlet 67 and the backward side of the axial directional outlet 67 with respect to the revolution direction Rv, that is, by blocking, with the weir 69, a portion positioned in the direction of resultant force Re of the centrifugal force Cf and the Coriolis force Co. Moreover, since the ring gear oil supply holes 59 in the wall 35c are arranged at positions that are located backward from the center of the wall 35c with respect to the revolution direction Rv of the planet gear 7, the lubricating oil OL is assuredly supplied to the ring gear 9 through the ring gear oil supply holes 59.

Next, a lubricating structure of the bearing 15 and a lubricating oil drainage structure are described with reference to FIG. 2. The bearing 15, which is disposed between the planet gear 7 and the planet shaft 13, is formed as a double-row roller bearing which includes two rolling element rows 72. Each rolling element row 72 includes: multiple rolling elements 73 which are cylindrical rollers; and an annular retainer 75 holding the rolling element row 72. The planet shaft 13 acts as an inner ring for the bearing 15. For each rolling element row 72, a rolling surface 77 for the rolling elements 73 is formed on the outer circumferential face of the planet shaft 13. Further, annular flanges 79 for restricting the position of the rolling elements 73 in the axial direction are provided at both ends of each rolling surface 77 in the axial direction.

In the peripheral wall of the planet shaft 13 having a hollow center, a pair of bearing oil supply holes 81A and 81B are formed at both ends, in the axial direction, of each rolling surface 77. Specifically, the pair of bearing oil supply holes 81A and 81B extend in the radial direction through the vicinity of the base portions of the respective flanges 79. A recess 23a, which communicates with the bearing oil supply holes 81A and 81B, is formed at the outer circumferential face of the fixed support shaft 23. Space formed by the recess 23a and the inner circumferential face 13a of the planet shaft 13 acts as oil reservoir space 83 for storing the lubricating oil OL. The planet shaft 13 is provided with a through-hole 85, which extends in the radial direction and of which the position in the axial direction corresponds to that of the front end of the recess 23a. Further, a bearing lubricating oil guide path 87, which communicates with the through-hole 85, is formed within the radially inner portion of the front plate 19. The bearing lubricating oil guide path 87 of the front plate 19 communicates with an external lubricating oil source (not shown) through the outer circumferential face of the cylindrical portion 19a, which is formed at the inner circumferential portion of the front plate 19 and which protrudes frontward in the axial direction.

The bearing lubricating oil guide path 87 of the front plate 19 (planet carrier 11), the through-hole 85 of the planet shaft 13, the oil reservoir space 83, and the bearing oil supply holes 81A and 81B of the planet shaft (inner ring) 13, which are formed as described above, collectively serve as a bearing oil supply path LP through which the lubricating oil OL is supplied to the rolling elements 73 of the bearing 15. Through the bearing oil supply path LP, the lubricating oil OL that is sent from the radially inner side of the planet gear 7 is supplied to both ends of each rolling element 73 which is a cylindrical roller.

Figure 8:
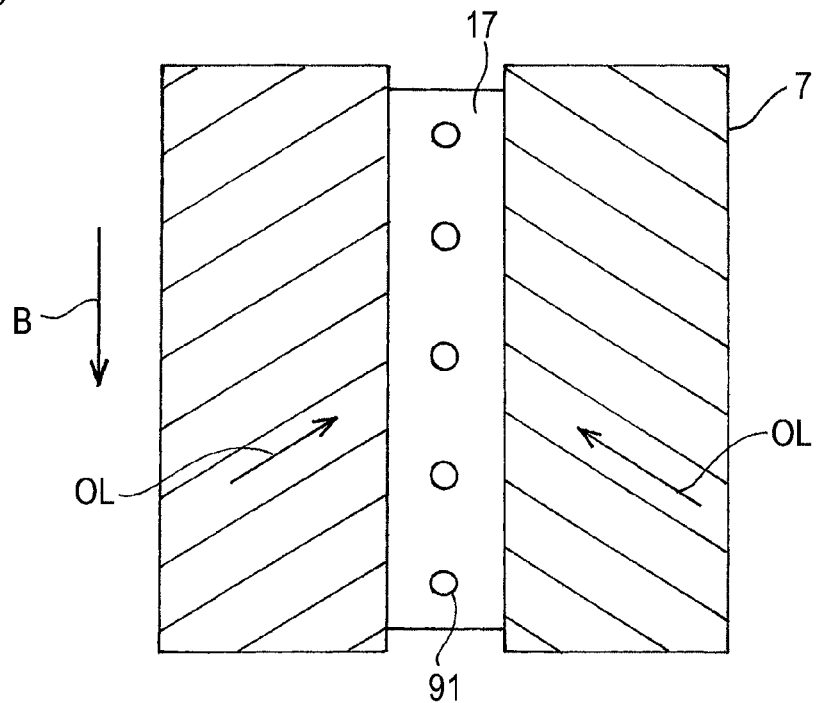
FIG. 8 is a front view of a planet gear for use in the planetary gear system shown in FIG. 1.

As described above, the planet gear 7 is formed as a double helical gear, which includes a pair of helical gears aligned in the axial direction, and the annular groove 17 is formed between the pair of helical gears. As shown in FIG. 8, multiple oil outlets 91 are formed at the annular groove 17 of the planet gear 7 as through-holes extending in the radial direction. These oil outlets 91 are arranged at equal intervals in the circumferential direction. The planet gear 7 rotates in a direction indicated by arrow B, which is opposite to a direction in which one set of helical teeth and the other set of helical teeth of the double helical gear are inclined toward each other. Therefore, when the lubricating oil OL is supplied to the gear tooth surfaces, the lubricating oil OL flows into the annular groove 17 positioned at the center of the planet gear 7.

Figure 9:
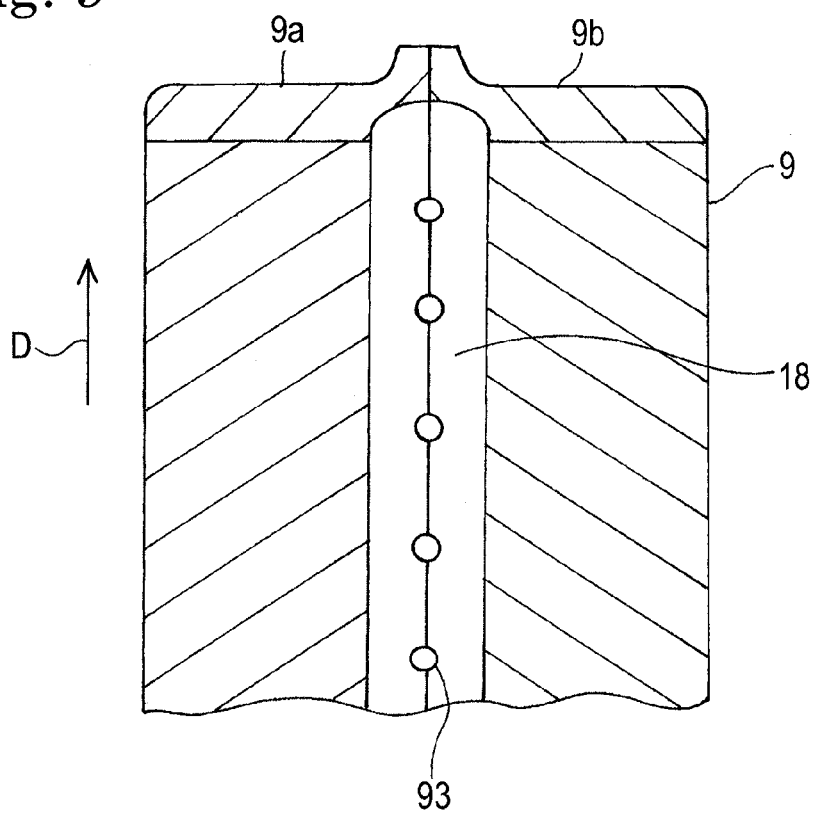
FIG. 9 is a transverse sectional view of a ring gear for use in the planetary gear system shown in FIG. 1.

Further, as shown in FIG. 9, the ring gear 9 is formed as a double helical gear, which includes a pair of helical gears aligned in the axial direction, and the annular groove 18 is formed between the pair of helical gears. The ring gear 9 is divided in the axial direction into two portions that are a gear half body 9a and a gear half body 9b. Teeth formed on one of the gear half bodies are inclined in a direction that is opposite to the inclination direction of teeth formed on the other one of the gear half bodies. Multiple outlets 93 are formed at the annular groove 18 of the ring gear 9 as through-holes extending in the radial direction. The outlets 93 are arranged at equal intervals in the circumferential direction.

Next, the operation of the planetary gear system 1 according to the above embodiment will be described.

The sun gear 5 of the planetary gear system 1 shown in FIG. 3 rotates in a direction indicated by arrow A. The driving force of the rotation causes the planet gears 7 to rotate in a direction indicated by arrow B, and also causes the planet gears 7 to revolve in a direction indicated by arrow Rv together with the planet carrier 11. The ring gear 9 rotates in a direction indicated by arrow D.

The lubricating oil OL that is supplied from the outside and that is guided into the baffle unit 35 through the gear lubricating oil guide paths 53 (see FIG. 2) is jetted toward the forward mesh position 43 through the oil supply holes 47 of the forward inclined face 41b of the baffle unit 35 and toward the backward mesh position 45 through the oil supply holes 47 of the backward inclined face 41c of the baffle unit 35. The temperature at a position where the teeth of gears come out of mesh becomes higher than the temperature at a position where the teeth of gears come into mesh. Therefore, for the purpose of cooling down such a temperature-increased position, the amount of lubricating oil OL supplied to the backward mesh position 45 where the teeth of the gears come out of mesh is greater than the amount of lubricating oil OL supplied to the forward mesh position 43. A part of the lubricating oil OL jetted toward the backward mesh position 45 flows outward through the backward gap 39 between the backward side face 37R of the baffle unit 35 and the backward planet gear 7R. Most of the lubricating oil OL flowing through the backward gap 39 is collected into the baffle unit 35 through the backward collection opening 55. In particular, the lubricating oil OL that has been used for lubricating the backward planet gear 7R and the sun gear 5 flows into the annular groove 17 shown in FIG. 8, owing to the rotation of the planet gear 7 which is a double helical gear. Then, the lubricating oil OL passes through the backward mesh position 45 shown in FIG. 3 and flows into the collection guide groove 57 of the baffle unit 35 (specifically, the central portion 57a shown in FIG. 5). Thereafter, the lubricating oil OL is collected into the baffle unit 35 through the backward collection opening 55. On the other hand, a part of the lubricating oil OL that is jetted through the oil supply holes 47 toward the forward mesh position 43 shown in FIG. 3 is collected into the baffle unit 35 through the forward collection opening 63.

The lubricating oil OL collected into the baffle unit 35 flows into the collection chamber 65. Thereafter, a part of the lubricating oil OL is held back by the weir 69 and then supplied to the ring gear 9 through the ring gear oil supply holes 59. In this manner, the ring gear 9 is effectively lubricated. The lubricating oil OL that overflows the weir 69 of the collection chamber 65 is discharged through the axial directional outlet 67 to the outside of the planetary gear system 1 in the frontward axial direction.

As described above, the baffle unit 35 is provided between the adjacent planet gears 7. The baffle unit 35 collects the lubricating oil OL therein while preventing flows of the lubricating oil around the respective adjacent planet gears 7 from interfering with each other. This makes it possible to prevent a large amount of lubricating oil OL from being adhered to the outer periphery of the planet gears 7 over a long circumferential distance. Accordingly, the agitation resistance of the lubricating oil OL is reduced. As a result, power loss of the planetary gear system 1 is reduced. It was confirmed through an experiment that power loss was reduced by 34 percent as compared to conventional art that does not include components corresponding to the collection openings 55 and 63 of the baffle unit 35 and the oil outlets 91 of the planet gear 7.

The lubricating oil OL that is supplied from the outside to the rolling elements 73 of the bearing 15 through the bearing oil supply path LP shown in FIG. 2 is, after lubricating the rolling elements 73, discharged to the outside of the planet gear 7. Here, the lubricating oil OL that is supplied to the rolling elements 73 through the bearing oil supple hole 81A which is disposed at an outer position in the axial direction is, after lubricating the rolling elements 73, discharged outward in the axial direction. On the other hand, the lubricating oil OL that passes through the bearing oil supply hole 81B which is disposed at an inner position in the axial direction enters space 96 between the two rolling element rows after lubricating the rolling elements 73. Then, at each rolling element row, as indicated by arrows G, a part of the lubricating oil OL passes between rolling elements 73 that are adjacent to each other in the circumferential direction, and is discharged outward in the axial direction. Another part of the lubricating oil OL is discharged to the radially outer side through the oil outlets 91. The lubricating oil OL that passes between rolling elements 73 as indicated by arrows G increases the agitation resistance for the rolling elements 73. However, by forming the oil outlets 91, the amount of lubricating oil OL passing between the rolling elements 73 is reduced. Accordingly, the agitation resistance is reduced.

The lubricating oil OL that is supplied to the ring gear 9 through the ring gear oil supply holes 59 of the baffle unit 35 and the oil outlets 91 of the planet gear 7 flows into the annular groove 18 after lubricating the gear tooth surfaces of the ring gear 9, and is then discharged in the radial direction to the outside of the planetary gear system 1 from the outlets 93.

As described above, the oil outlets 91 are formed in the planet gear 7 located at a radially outer position than the rolling elements 73 which are supplied with the lubricating oil OL. This makes it possible to efficiently discharge, to the outside of the planet gear 7, the lubricating oil OL that is supplied to the rolling elements 73 from the radially inner side. Accordingly, the agitation resistance of the lubricating oil OL around the rolling elements 73 is reduced. As a result, power loss of the planetary gear system is reduced significantly. In addition, the lubricating oil OL that is discharged from the planet gear 7 can be used for lubricating the ring gear 9 which is disposed at a radially outer position than the planet gear 7.

It should be noted that the structure of the planet gear 7, in which the lubricating oil OL that has been supplied to the bearing 15 is discharged to the radially outer side through the oil outlets 91 which communicate with the space between the two rolling element rows which are aligned in the axial direction, is applicable not only to the above-described planetary gear system 1 but to any gear system, so long as the gear system includes a gear that is rotatably supported by a fixed support shaft via a pair of rolling element rows that are aligned in the axial direction.

Although a preferred embodiment of the present invention is as described above with reference to the drawings, various additions, modifications, and deletions may be made to the above embodiment without departing from the spirit of the present invention. Therefore, such additions, modifications, and deletions also fall within the scope of the present invention.

INDUSTRIAL APPLICABILITY

According to the present invention, the lubricating oil that is supplied to main rotating components of the planetary gear system is efficiently discharged, and thereby power loss is reduced. Thus, the present invention is useful to reduce power loss in a planetary gear system.

REFERENCE SIGNS LIST 1 planetary gear system
5 sun gear
7 planet gear
9 ring gear
11 planet carrier
13 planet shaft
17 annular groove of planet gear
35 baffle unit
37F, 37R side face of baffle unit
41 tip portion of baffle unit
43, 45 mesh position
47 oil supply hole
55 collection opening
OL lubricating oil

The invention claimed is:

1. A planetary gear system comprising:
a sun gear having external teeth;
a plurality of planet gears having external teeth, each planet gear meshing with the sun gear;
a ring gear having internal teeth, the ring gear meshing with the planet gears; and
a baffle unit disposed between the planet gears which are adjacent to each other, the baffle unit having side faces positioned near outer peripheries of the respective planet gears, wherein
the baffle unit has:
oil supply holes which are formed in a tip portion facing an outer periphery of the sun gear and which jet out lubricating oil to mesh positions between the sun gear and the planet gears; and
a collection opening which is formed in at least one of the side faces and through which the lubricating oil that has been jetted out is collected into the baffle unit.

2. The planetary gear system according to claim 1, wherein each planet gear is a double helical gear having an annular groove formed at an outer circumferential face of an axially central portion of the double helical gear.

3. The planetary gear system according to claim 1, wherein a guide piece which guides the lubricating oil to the collection opening is formed at the at least one of the side faces of the baffle unit.

4. The planetary gear system according to claim 1, wherein the baffle unit has a ring gear oil supply hole formed therein, through which the collected lubricating oil is supplied to the ring gear.

5. The planetary gear system according to claim 1, wherein the baffle unit has an outlet formed therein, through which the collected lubricating oil is discharged in an axial direction.

6. The planetary gear system according to claim 5, wherein the baffle unit includes a weir, which blocks the outlet at a radially outer side of the planet gears and at a backward side with respect to a revolution direction of the planet gears.

7. The planetary gear system according to claim 1, wherein a collection guide groove which guides the lubricating oil to the collection opening is formed so as to extend from an inner end of the at least one of the side faces of the baffle unit to the collection opening.

* * * * *